United States Patent [19]
Dvonch et al.

[11] 3,886,186
[45] May 27, 1975

[54] MONONITRATE ESTERS OF 1,4:3,6-DIANHYDRO-D-GLUCITOL

[75] Inventors: William Dvonch, Radnor; Harvey E. Alburn, West Chester, both of Pa.

[73] Assignee: American Home Products Corporation, New York, N.Y.

[22] Filed: Aug. 30, 1973

[21] Appl. No.: 393,087

Related U.S. Application Data

[63] Continuation of Ser. No. 138,805, April 29, 1971, abandoned.

[52] U.S. Cl. ....... 260/347.2; 260/347.3; 260/347.4; 260/347.8; 424/285
[51] Int. Cl. ............................................. C07d 5/32
[58] Field of Search........... 260/347.2, 347.4, 347.8, 260/235

[56] References Cited
OTHER PUBLICATIONS

L. Hayward et al., "Can. Jour. of Chem." Vol. 45, 1967, p. 2191–94.

*Primary Examiner*—Harry I. Moatz
*Attorney, Agent, or Firm*—David E. Frankhouser

[57] ABSTRACT

The 2- and 5-nitrate esters of 1,4:3,6-dianhydro-D-glucitol are prepared by nitrating 1,4:3,6-dianhydro-D-glucitol. The mononitrates so produced are separated and converted by standard procedures to derivatives in which an alkyl, benzoyl, cycloalkyl, carbamoyl, sulfamoyl, or benzoyl radical is substituted on the hydroxyl group. The derivatives possess cardiovascular activity.

6 Claims, No Drawings

MONONITRATE ESTERS OF 1,4:3,6-DIANHYDRO-D-GLUCITOL

This is a continuation of application Ser. No. 138,805 filed Apr. 29, 1971, now abandoned.

BACKGROUND OF THE INVENTION

This invention relates to compositions of matter classified in the art of chemistry as 0-substituted mononitrate esters of 1,4:3,6-dianhydro-D-glucitol.

1,4:3,6-Dianhydro-D-glucitol, dinitrate (also known as isosorbide dinitrate) is a medicament available commercially as an agent for the treatment of angina pectoris. The 2- and 5- mononitrates of 1,4:3,6-dianhydro-D-glucitol are also known, being disclosed by Hayward et al. in the Can. J. Chem., 45, 2191 (1947) which describes the stereochemistry of the nitrate groups. Hayward also discloses 1,4:3,6-dianhydro-D-glucitol, 5-nitrate, 2-p-toluenesulfate, a compound structurally different than those of this invention. It has also been reported [Reed et al. Fed. Proc. 29, 678 (1970)] that the mononitrates are metabolites of 1,4:3,6-dianhydro-D-glucitol, dinitrate. The above references do not disclose that the mononitrates possess biological activity.

SUMMARY OF THE INVENTION

The invention sought to be patented as a composition of matter resides in the concept of a chemical compound selected from the group consisting of those having the structures of Formula I and II:

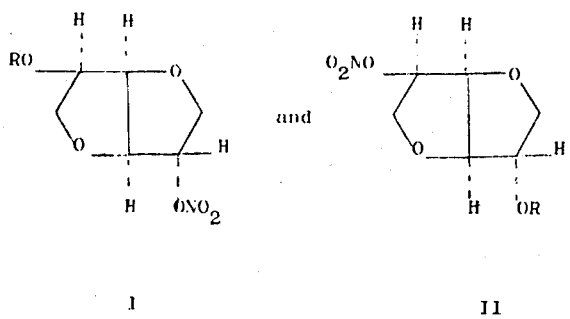

wherein R is lower alkanoyl, benzoyl, lower alkyl, carbamoyl, sulfamoyl, or benzyl.

The tangible embodiments of the compositions of the invention possess the inherent general physical properties of being low melting solids; are soluble or slightly soluble in water; and are soluble in polar solvents, such as chloroform, lower aliphatic alcohols, and ether.

Examination of compounds produced according to the hereinafter described process reveals upon infra red spectrophotometric analysis spectral data confirming the molecular structure hereinbefore set forth.

The aforementioned physical characteristic taken together with the elemental analyses, the nature of the starting materials and the mode of synthesis, positively confirm the structures of the compositions sought to be patented.

As used herein the terms "lower alkanoyl" and "lower alkyl" are meant to include branched, straight chain, and cyclic aliphatic moieties having from one to six carbon atoms, among which are for purposes of illustration without limiting the generality of the foregoing. methyl, ethyl, propyl, isopropyl, n-butyl, t-butyl, amyl, iso-amyl, and n-hexyl, and the cyclized lower alkyl radicals, cyclobutyl, cyclopentyl, and cyclohexyl.

The tangible embodiments of the invention possess the inherent applied use characteristics of lowering systemic blood pressure and coronary resistance in standard pharmacological tests, thus indicating utility as an anti-anginal agent. Said cardiovascular effects may be elicited by the following procedures:

Mongrel dogs weighing between 20 and 25 kg. are anesthetized with pentobarbital sodium (30 mg/kg) intravenously. Anesthesia is maintained with an intravenous pentobarbital infusion at a rate of 5 mg/kg/hr. A left lateral thoracotomy at the level of the fifth intercostal space is performed and the lungs respired artifically with a Harvard respirator.

The compounds to be tested are suspended in water containing 2:3 Carbowax-saline solution. The suspension is administered over a 5-minute period by infusion through a cannula inserted into the femoral vein. Each animal is given the compound at a rate of 0.5 mg/kg/min., after a control period of approximately 30 minutes. Systemic blood pressure is measured through a cannula inserted into the left femoral artery and connected to a Statham pressure transducer. All recordings are made on a Beckman Type R oscillograph. Circumflex coronary blood flow is measured by means of a Statham electromagnetic flowmeter system. The flow probe is placed around the surgically exposed circumflex coronary artery approximately 2 cm. distal to the bifurcation of the main left coronary artery. Zero flows are determined by mechanical occlusion of the artery just distal to the site of the flowmeter probe. Calibration of the probes is accomplished previously by placing the probe around an appropriate-sized vessel and passing heparinized blood through the vessel at a controlled rate of flow. Systemic blood pressure and coronary blood flow are measured at 1, 5, 30, and 120 minutes after start of infusion. Coronary resistance is calculated as the ratio of mean systemic blood pressure (computed as diastolic pressure plus one-third of pulse pressure) divided by the circumflex blood flow. All changes measured refer to the initial control levels prior to the injection of the drug.

When tested by the above procedures the following compounds show significant reduction in systemic blood pressure and coronary resistance:

1,4:3,6-dianhydro-D-glucitol, 5-acetate, 2-nitrate.
1,4:3,6-dianhydro-D-glucitol, 2-acetate, 5-nitrate.
1,4:3,6-dianhydro-D-glucitol, 2-ethyl ester, 5-nitrate.
1,4:3,6-dianhydro-D-glucitol, 5-nitrate, 2-sulfamate.
1,4:3,6-dianhydro-D-glucitol, 2-carbamate, 5-nitrate.
1,4:3,6-dianhydro-D-glucitol, 5-carbamate, 2-nitrate.

The manner and process of making the compositions sought to be patented will now ben generally described so as to enable a person skilled in the art of chemistry to make the same as follows:

The mononitrate starting materials (III and IV) are prepared by nitrating 1,4:3,6-dianhydro-D-glucitol with fuming nitric acid in a mixture of acetic acid and acetic anhydride at 10°–15°C.

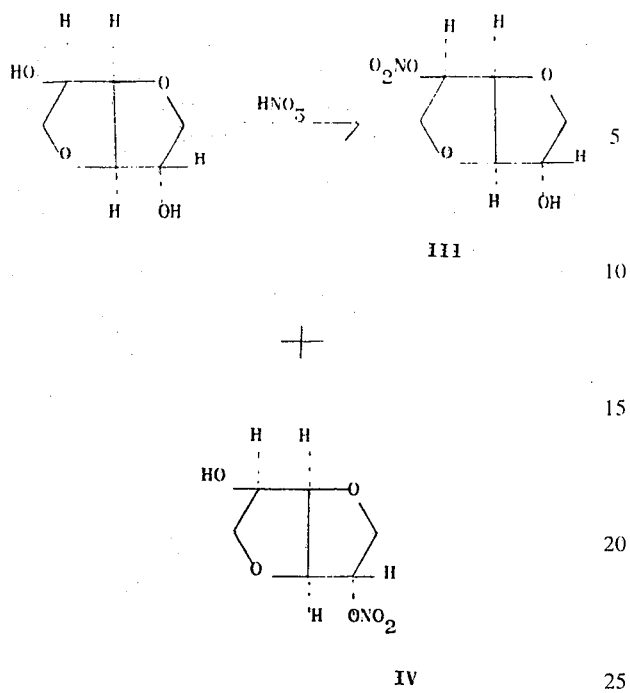

This procedure yields a mixture of the 2-nitrate (IV) and the 5-nitrate (III), which may be separated by liquid column chromatography on neutral grade III alumina to give substantially pure III and IV.

The mononitrates are converted to the final compounds of the present invention by procedures well known in the art of organic chemistry.

When it is desired to prepare a compound of either Formula I or II wherein R is lower alkanoyl or benzoyl, the mononitrate (III or IV) is treated with an appropriate lower alkyl acid halide, preferably the chloride, or acid anhydride in the presence of an amine such as pyridine. If it is desired to prepare a compound of Formula I or II wherein R is lower alkyl or benzyl the mononitrate is treated with an appropriate lower alkylhalide, preferably the iodide, in a lower alkanol in the presence of silver oxide. A compound of Formula I or II, wherein R is sulfamoyl, is prepared by treating the mononitrate with sulfamoyl chloride in an inert solvent such as dimethoxyethane in the presence of an amine such as pyridine. A compound of Formula I or II, wherein R is carbamoyl, is prepared in two steps by: (a) treating the mononitrate with phosgene in an inert solvent such as dioxane and, (b) treating the product with ammonia in an inert solvent such as dioxane.

It will be apparent to those skilled in the art of organic chemistry that a substituted phenyl moiety can be used in place of an unsubstituted phenyl in the reagents hereinbefore described. The phenyl substituents can be any group which does not interfere with the course of the reaction, for example, lower alkyl, chlorine, bromine, iodine, fluorine, cyano, lower alkanoyl, hydroxy, or lower alkoxy. The aryl 0-substituted mononitrates so produced are fully equivalent to the compositions particularly described and claimed herein for the purposes of the invention.

The following examples are illustrative of the invention:

EXAMPLE I 1,4:3,6-Dianhydro-D-Glucitol, 2-Nitrate and 5-Nitrate

Fuming nitric acid of sp. gr. 1.5 (17.25 g, 11.5 ml, 0.274 mole) is slowly added to a mixture of acetic anhydride and acetic acid (18 ml; 18 ml) at −2° to 5°C in an ice-salt bath over about 1 hr. The nitration mixture is added dropwise over 0.5 hr. to a stirred solution of 1,4:3,6-dianhydro-D-glucitol (40.0 g, 0.274 mole) in a mixture of acetic anhydride and acetic acid (230 ml; 1086 ml) maintained at 10°–15°C. After 2 hr., the mixture is poured into ice and water (2 liter), stirred 0.5 hr., and extracted 3 times with ether. The ether solution is concentrated in vacuo with the addition of water, and the resulting aqueous solution is freeze-dried to give a mixture of nitrates. These nitrates are separated by liquid column chromatography on a neutral grade III alumina at a column loading of 1:25. Elution with chloroform gives 3.2 g. of the 2-nitrate, m.p. 52°–56°C.

Analysis for $C_6H_9NO_6$
Calculated:     C, 37.70; H, 4.75; N, 7.33
Found:     C, 37.76; H, 4.86; N, 7.12

Elution with chloroform-methanol (95:5 v/v) yields 11.0 g. of the 5-nitrate, m.p. 88°–90°C.

Analysis for $C_6H_9NO_6$
Calculated:     C, 37.70; H, 4.75; N, 7.33
Found:     C, 37.92; H, 4.86; N, 7.09

EXAMPLE II 1,4:3,6-Dianhydro-D-Glucitol, 2-Acetate, 5-Nitrate 1,4:3,6-Dianhydro-D-glucitol, 5-nitrate (5.0 g, 0.025 mole) is added to a mixture of pyridine (35 ml) and acetic anhydride (23 ml) at 0°C. The solution is allowed to stand in the cold for 5 hr., overnight at room temperature, and then added to a mixture of ice and water (125 ml). After 1 hr., the crystalline product is filtered to yield 4.0 g of the title compound, m.p. 96°–98°C.

Analysis for $C_8H_{11}NO_7$
Calculated:     C, 41.20; H, 4.76; N, 6.01
Found:     C, 41.50; H, 4.89; N, 6.30

When tested according to the procedures hereinbefore described, the title compound showed the following cardiovascular effects:

| % Change of | Time after Start of Infusion (Minutes) | | | |
|---|---|---|---|---|
| | 1 | 5 | 30 | 120 |
| Systemic Blood Pressure | −37±7 | −22±4 | −12±2 | −15±2 |
| Coronary Blood Flow | +20±9 | −27±5 | −21±1 | −41±10 |
| Calculated Coronary Resistance | −25±6 | +4±5 | +11±0 | +54±23 |

Results are given as the mean value ± S.E.M.

EXAMPLE III

1,4:3,6-Dianhydro-D-Glucitol, 5-Acetate, 2-Nitrate

The procedure of Example II is followed substituting 1,4:3,6-dianhydro-D-glucitol, 2-nitrate for the 5-nitrate starting material. The product precipitates as an oil which is extracted into chloroform. The chloroform solution is washed with dilute aqueous sodium bicarbonate, aqueous copper sulfate, and finally with water. Removal of the solvent yields 2.7 g. of the title compound as an oil.

Analysis for $C_8H_{11}NO_7$
Calculated: C, 41.20; H, 4.76; N, 6.01
Found: C, 41.88; H, 4.99; N, 5.90

When tested according to the procedures hereinbefore described, the title compound showed the following cardiovascular effects:

| % Change of | Time after Start of Infusion (Minutes) | | | |
|---|---|---|---|---|
| | 1 | 5 | 30 | 120 |
| Systemic Blood Pressure | −11±7 | −31±11 | −22±8 | −18±12 |
| Coronary Blood Flow | +9±11 | −18±17 | −20±5 | −34±5 |
| Calculated Coronary Resistance | −19±3 | −16±6 | −4±3 | −23±8 |

EXAMPLE IV

Following the procedures of Example II and III but substituting equivalent amounts of the appropriate acid anhydride, there are obtained the products shown below:

| Starting Material | Anhydride | Product |
|---|---|---|
| 1,3:4,6-dianhydro-D-glucitol, 2-nitrate | propionic anhydride | 1,3:4,6-dianhydro-D-glucitol, 2-nitrate, 5-propionate |
| 1,3:4,6-dianhydro-D-glucitol, 5-nitrate | caproic anhydride | 1,3:4,6-dianhydro-D-glucitol, 2-caproate, 5-nitrate |
| 1,3:4,6-dianhydro-D-glucitol, 5-nitrate | isobutyric anhydride | 1,3:4,6-dianhydro-D-glucitol, 2-isobutyrate, 5-nitrate |
| 1,3:4,6-dianhydro-D-glucitol, 2-nitrate | butyric anhydride | 1,3:4,6-dianhydro-D-glucitol, 5-butyrate, 2-nitrate |
| 1,3:4,6-dianhydro-D-glucitol, 2-nitrate | isobutyric anhydride | 1,3:4,6-dianhydro-D-glucitol, 5-isobutyrate, 2-nitrate |
| 1,3:4,6-dianhydro-D-glucitol, 2-nitrate | benzoic anhydride | 1,3:4,6-dianhydro-D-glucitol, 5-benzoate, 2-nitrate |
| 1,3:4,6-dianhydro-D-glucitol, 5-nitrate | benzoic anhydride | 1,3:4,6-dianhydro-D-glucitol, 2-benzoate, 5-nitrate |

EXAMPLE V

1,4:3,6-Dianhydro-2O-Ethyl-D-Glucitol, 5-Nitrate 1,4:3,6-Dianhydro-D-glucitol, 5-nitrate (1.91 g, 0.010 mole) and ethyl iodide (15.6 g, 8.0 ml; 0.010 mole) in ethyl alcohol (10 ml) are heated under reflux with stirring while freshly prepared silver oxide (11.6 g, 0.050 mole) is added in 10 portions at 0.5 hour intervals. The mixture is finally refluxed in chloroform, and the mixture filtered. The combined filtrates are concentrated to an oil which is separated by the alumina chromatography used for the mononitrates into the starting material and the title product. Yield, 0.73 g.

Analysis for $C_8H_{13}NO_6$
Calculated: C, 43.83; H, 5.98; N, 6.39
Found: C, 43.99; H, 6.15; N, 6.47

When tested according to the procedures hereinbefore described, the title compound showed the following cardiovascular effects:

| % Change of | Time after Start of Infusion (Minutes) | | | |
|---|---|---|---|---|
| | 1 | 5 | 30 | 120 |
| Systemic Blood Pressure | −13±5 | −37±9 | −11±9 | +5±12 |
| Coronary Blood Flow | −5±8 | −25±11 | −14±5 | −17±11 |
| Calculated Coronary Resistance | −8±5 | −14±2 | +4±5 | +29±19 |

EXAMPLE VI

Following the procedure of Example V but substituting equivalent amounts of an appropriate alkyliodide for ethyl iodide, there are obtained the products shown below:

| Starting Material | Alkyl Iodide | Product |
|---|---|---|
| 1,3:4,6-dianhydro-D-glucitol, 2-nitrate | n-pentyl | 1,4:3,6-dianhydro-5-O-pentyl-D-glucitol, 2-nitrate |
| 1,3:4,6-dianhydro-D-glucitol, 5-nitrate | n-hexyl | 1,4:3,6-dianhydro-2-O-n-hexyl-D-glucitol, 5-nitrate |
| 1,3:4,6-dianhydro-D-glucitol, 5-nitrate | n-propyl | 1,4:3,6-dianhydro-2-O-n-propyl-D-glucitol, 5-nitrate |
| 1,3:4,6-dianhydro-D-glucitol, 2-nitrate | isopropyl | 1,4:3,6-dianhydro-5-O-isopropyl-D-glucitol, 2-nitrate |
| 1,3:4,6-dianhydro-D-glucitol, 2-nitrate | cyclobutyl | 1,4:3,6-dianhydro-5-O-cyclobutyl-D-glucitol, 2-nitrate |
| 1,3:4,6-dianhydro-D-glucitol, 5-nitrate | cyclopentyl | 1,4:3,6-dianhydro-2-O-cyclopentyl-D-glucitrol, 5-nitrate |
| 1,3:4,6-dianhydro-D-glucitol, 2-nitrate | cyclohexyl | 1,4:3,6-dianhydro-5-O-cyclohexyl-D-glucitol, 2-nitrate |

EXAMPLE VII 1,4:3,6-Dianhydro-D-Glucitol, 5-Nitrate, 2-Sulfamate 1,4:3,6-Dianhydro-D-glucitol, 5-nitrate (1.91 g, 0.010 mole) and pyridine (0.97 ml, 0.012 mole) in dimethoxyethane (15 ml) are treated with sulfamoyl chloride (1.39 g, 0.012 mole) in dimethoxyethane (15 ml) added over 1 hr. The reaction is allowed to stand overnight and added to a mixture of ice and water (80 ml). The product is filtered, washed, dried to yield 1.11 g of the title compound, m.p. 133°–134'C.

Analysis for $C_6H_{10}N_2O_8S$
Calculated:  C, 26.67; H, 3.73; N, 10.37
Found:       C, 26.76; H, 3.85; N, 10.34

When tested according to the procedures hereinbefore described, the title compound showed the following cardiovascular effects:

| % Change of | Time after Start of Infusion (Minutes) | | | |
| --- | --- | --- | --- | --- |
| | 1 | 5 | 30 | 120 |
| Systemic Blood Pressure | −1±1 | −38±3 | −31±12 | −19±13 |
| Coronary Blood Flow | −1±1 | −32±6 | −40±10 | −37±13 |
| Calculated Coronary Resistance | 0±1 | −7±8 | +15±4 | +33±6 |

EXAMPLE VIII 1,4:3,6-Dianhydro-D-Glucitol, 2-Nitrate, 5-Sulfamate

The title compound is prepared by the procedure of Example VII substituting 1,4:3,6-dianhydro-D-glucitol, 2-nitrate for the 5-nitrate.

EXAMPLE IX 1,4:3,6-Dianhydro-D-Glucitol, 2-Carbamate, 5-Nitrate 1,4:3,6-Dianhydro-D-glucitol, 5-nitrate (1.91 g, 0.010 mole) in dioxane (50 ml) is treated with phosgene under dry-ice reflux at a temperature of 35°C. The phosgene flow is stopped when the volume of the solution is increased to 60 ml. The solution is then heated at reflux for 2 hr., after which excess phosgene is removed by a nitrogen flush. The solution is concentrated and taken up in dioxane. The dioxane solution is treated with ammonia for 2 hr. at 5°–10°C. Excess ammonia is removed by blowing with air. The solution is concentrated to give a syrup which is dissolved in water. The resulting precipitate is filtered and recrystallized from ethyl alcohol to give 0.33 g. of the title compound, m.p. 170°–172°C.

Analysis for $C_7H_{10}N_2O_7$
Calculated:  C, 35.90; H, 4.30; N, 11.96
Found:       C, 36.14; H, 4.61; N, 11.55

When tested according to the procedures hereinbefore described, the title compound showed the following cardiovascular effects:

| % Change of | Time after Start of Infusion (Minutes) | | | |
| --- | --- | --- | --- | --- |
| | 1 | 5 | 30 | 120 |
| Systemic Blood Pressure | −14±4 | −23±14 | −15±4 | −14±4 |
| Coronary Blood Flow | 0±2 | −19±3 | −18±5 | −19±10 |
| Calculated Coronary Resistance | −15±5 | −5±17 | +5±8 | +9±10 |

EXAMPLE X 1,4:3,6-Dianhydro-D-Glucitol, 5-Carbamate, 2-Nitrate

Following the procedure of Example IX but substituting 1,4:3,6-dianhydro-D-glucitol, 2-nitrate for the 5-nitrate, there is obtained the title compound, m.p. 134°–136°C.

Analysis for $C_7H_{10}N_2O_7$
Calculated:  C, 35.90; H, 4.30; N, 11.96
Found:       C, 35.64; H, 4.28; N, 11.83

When tested according to the procedures hereinbefore described, the title compound showed the following cardiovascular effects:

| % Change of | Time after Start of Infusion (Minutes) | | | |
| --- | --- | --- | --- | --- |
| | 1 | 5 | 30 | 120 |
| Systemic Blood Pressure | −13±2 | −28±6 | −23±2 | −31±5 |
| Coronary Blood Flow | +28±18 | +11±29 | −5±15 | −9±21 |
| Calculated Coronary Resistance | −30±10 | −43±19 | −16±14 | −16±19 |

The subject matter which the applicants regard as their invention is particularly pointed out and distinctly claimed as follows:

1. A compound which is 1,4:3,6-dianhydro-D-glucitol, 5-acetate, 2-nitrate.
2. A compound which is 1,4:3,6-dianhydro-D-glucitol, 5-carbamate, 2-nitrate.
3. A compound which is 1,4:3,6-dianhydro-D-glucitol, 2-acetate, 5-nitrate.
4. A compound which is 1,4:3,6-dianhydro-2-O-ethyl-D-glucitol, 5-nitrate.

5. A compound which is 1,4:3,6-dianhydro-D-glucitol, 5-nitrate, 2-sulfamate.

6. A compound which is 1,4:3,6-dianhydro-D-glucitol, 2-carbamate, 5-nitrate.

* * * * *